March 6, 1945.  F. B. MENGER ET AL  2,371,060
METHOD OF FORMING CORK ARTICLES
Original Filed Aug. 23, 1939  2 Sheets-Sheet 1
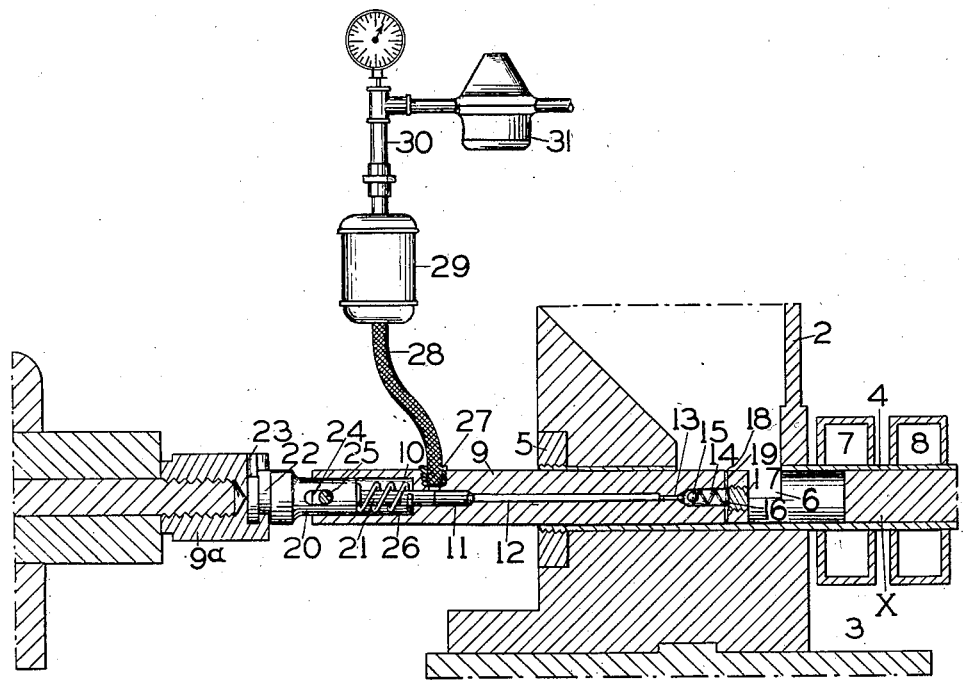
Inventors
Francis B Menger
Luther E. Gaught
by
Walter + Kaufman
Attorney

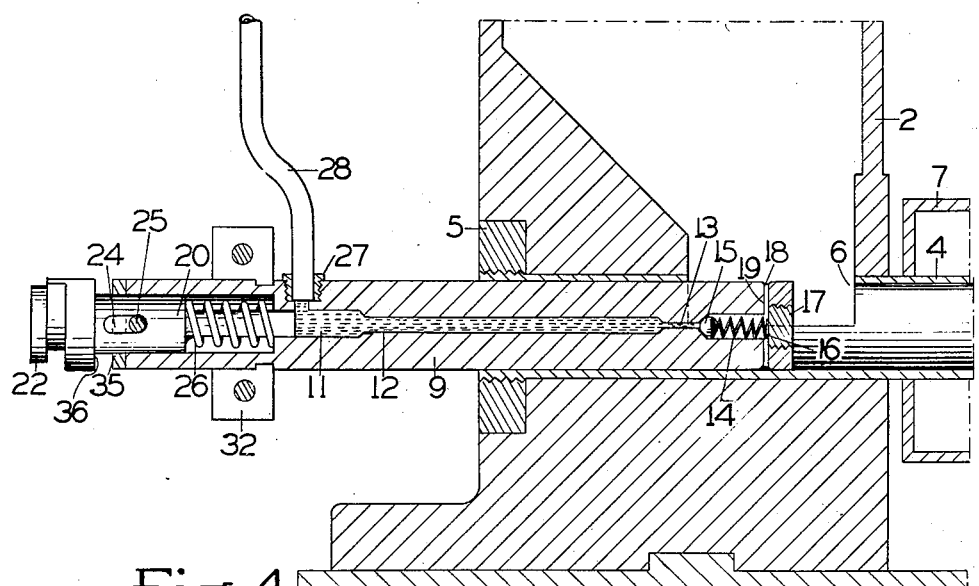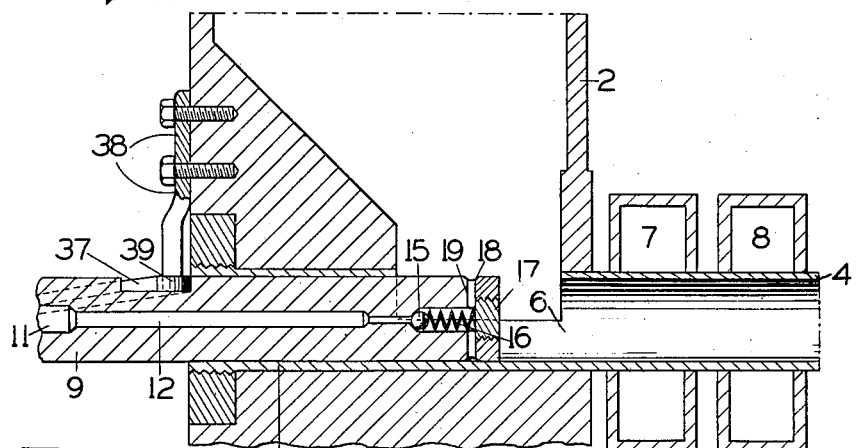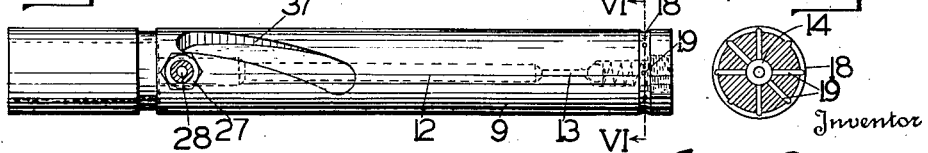

Patented Mar. 6, 1945

2,371,060

UNITED STATES PATENT OFFICE 2,371,060

METHOD OF FORMING CORK ARTICLES

Francis B. Menger, Lancaster Township, Lancaster County, and Luther E. Gaenzle, Lancaster, Pa., assignors to Armstrong Cork Company, Lancaster, Pa., a corporation of Pennsylvania Original application August 23, 1939, Serial No. 291,614. Divided and this application September 3, 1942, Serial No. 457,196

7 Claims. (Cl. 18—55)

This application is a division of our copending application Serial No. 291,614, filed August 23, 1939, now Patent 2,307,055, issued January 5, 1943, and entitled Apparatus for the extrusion of cork.

This invention pertains to the forming of cork articles by the method which is referred to as "extrusion" and relates particularly to an extrusion method by which a proper condition of lubrication is maintained in the extrusion tube or barrel.

In the method of forming cork by extrusion, the natural cork is disintegrated into small pieces or granules. These granules are then mixed with a binding agent, a very small percentage of binder being used. Binders which are commonly employed are mixtures of gelatine and formaldehyde with possibly some glycerine to act as a plasticizer, and another binding agent which is used is phenolic resin. The cork granules or particles, after they have had a binder properly applied thereto, are dry, more or less discrete particles which at room temperature have little tendency to cohere, and the amount of binder employed is so small that normal inspection does not reveal its presence. The prepared cork particles are charged into a hopper at the base of which is a horizontally or vertically extending extrusion tube or barrel. A plunger reciprocates back and forth in the bottom of the hopper and into the barrel. On each forward stroke it pushes some of the material in the hopper into the extrusion tube or barrel. The fresh material being pushed into the barrel is forced up against previously compacted material already in the barrel and is tightly compacted against the mass that has already been formed in the barrel. As additional increments of material are forced into one end of the extrusion tube and compacted, the compacted mass is forced out the open end of the extrusion tube as a continuous length of molded and bonded cork particles more or less densely compacted. The extruded mass is periodically cut off, usually into regular lengths for subsequent fabrication and use. Extruded cork rods of the proper diameter are extensively used to form the liners for crown caps, the rods being cut transversely into thin slices to form the disks or liners that are subsequently applied to the crown caps. Extruded cork is also used extensively for cork spinning cots, expansion joints, etc.

When the mass of compacted cork is being forced through the extrusion barrel or tube, heat is applied to the barrel. The heat, in conjunction with pressure, causes the binder to set. It is well known that cork, when it is pressed against metal, has a high coefficient of friction and will not readily slip or slide over the surface into contact with which it is pressed. The compacted mass of cork particles in the extrusion tube being compressed against the walls of the tube, has a tremendous frictional engagement with the walls of the tube, and the resistance of the compacted mass to movement through the tube is further increased when the mass is heated due to the fact that the air within the cells of the cork is expanded by the heat, tending to expand the volume of the mass in every direction. While considerable resistance to the free movement of the cork through the extrusion tube is necessary in order to secure the necessary compacting and bonding of the mass, an excessive amount of friction between the compacted cork and the barrel will prevent the compacted mass from moving along inside the tube and the mass being extruded "freezes" in the extrusion tube and if further increments of cork are forced into the tube, the tube is expanded and destroyed. To prevent the excessive resistance of the cork to movement through the extrusion barrel, it has heretofore been the practice to apply to the cork particles, usually at the same time the binder is being applied, material which will function as a lubricant. When the cork particles are subjected to a pressure in the extrusion tube, some of this lubricating material will be forced out against the interior of the barrel and some of it will be attracted to the exterior of the mass by capillary action as the heat penetrates through the mass. This lubricant which thus comes to the surface of the mass and comes into contact with the interior of the barrel or tube, serves to reduce the friction and prevent freezing or reduces the tendency of the mass to freeze.

This method as above described for lubricating the interior of extrusion tubes is open to several objections. In the first place, while the quantity of lubricant used is very small, all of the lubricant cannot be forced to the outside of the mass and much of it is retained in the body of the mass being formed. This may be objectionable in some instances where liquids are sealed with such liners and particularly where the liquid is sterilized in the container and the container and contents are subjected to heat.

Where the extruded material is subsequently to be used for a friction surface, the presence of lubricant diffused through the mass is obviously objectionable because it reduces the coefficient of friction of the material. Its presence in the material often interferes with the dressing of the molded cork surfaces by abrasive wheels as is necessary, for example, in using extruded cork for cots of spinning rolls. These cots are usually prepared by buffing the surface thereof initially and from time to time after they have been used with an abrasive wheel, and the small amounts of lubricant in the extruded cork composition tend to choke the pores in the abrasive wheels so that the abrasive wheels have to be dressed from time to time to enable them to properly buff the cots. In addition to the objections, some of which are noted above, to the presence of the lubricant in the molded article, this method of lubrication now generally employed is also unsatisfactory for other reasons. In the first place, a lubricant and bond cannot be compatible and therefore the presence of lubricant interferes to some extent with the effectiveness of the binder which is used to bond the granules of cork together. Also, considerably more lubricant has to be used than is actually required for the purpose for which it is provided.

The present invention pertains to process for the production of a cork composition article wherein only the material on the surface of the article has lubricant applied thereto and a method whereby the article is formed by extrusion with the lubricant applied directly to the interior wall of the extrusion tube or barrel in small quantities where it is picked up by the cork particles which move along in contact with the interior of the barrel. The lubricant thus picked up by the cork is carried along with the compacted mass serving to properly lubricate the movement of the compacted mass through the tube. Articles formed by extrusion are usually shaved by a mechanical shaving or trimming device to remove the outer skin or outside parts of the extruded articles and bring the articles down to the finished size which is required. When lubricant is applied in accordance with the present invention, the material which carries the lubricant is thus for the most part trimmed or shaved off in this operation so that none or little of the lubricant is in the finished article. The invention therefore overcomes the objections which have heretofore been encountered by having lubricant applied to the entire mass of the cork particles before they are charged into the extruding machine with a resulting improvement in product, saving of lubricant, and increase of effectiveness of the bond.

Our invention may be readily understood by reference to the accompanying drawings which disclose certain apparatus useful in effecting our method for the production of a cork composition article. In the drawings:

Figure 1 is a longitudinal vertical section through a portion of a typical cork extruding machine arranged to effect the method of our invention, the extruding plunger in this view being shown in its retracted position;

Figure 2 is a longitudinal vertical section generally similar to Figure 1 but on a slightly larger scale showing a modified form of apparatus for carrying out the method of our invention, the plunger in this view also being shown in its retracted position;

Figure 3 is a horizontal section of the apparatus shown in Figure 2;

Figure 4 is a view similar to Figure 2 showing a further modification in which means is shown for imparting a slight rotary motion to the plunger;

Figure 5 is an elevation showing a plunger having a helical groove therein for use in the arrangement shown in Figure 4;

Figure 6 is a transverse section through the plunger near its inner end, the view being in substantially the plane of line VI—VI of Figure 5, the view being illustrative of this portion of the plunger in all of the embodiments illustrated.

Referring first to the construction shown in Figure 1, 2 designates a hopper fixed on a support 3. Passing horizontally through the hopper is a tube 4, the rear end of which is screw-threaded into an abutment 5 which firmly anchors the tube against movement in the direction in which the compacted mass is moved. Machines of this character as usually constructed generally have a plurality of these tubes arranged in side-by-side relation, as is well understood by those skilled in the art, but since this forms no part of the present invention, it has not been illustrated, a single tube sufficing to illustrate the present invention. The tube is cut away at 6 so that material in the hopper may flow into the tube. The forward end of the tube projects beyond the hopper. A chamber 7 is provided around the projecting end of the tube for the circulation of a cooling fluid therethrough, this chamber being close to the hopper. Between the chamber 7 and the end of the tube is a similar structure providing a chamber 8 for the circulation of a heating fluid. Heat is required to set the binder while the cooling chamber 7 is provided to prevent the transfer of heat along the tube into the hopper.

An extruding plunger 9 is slidably fitted in the tube 4 and a reciprocating head 9a serves to operate this plunger. Hydraulic power may be used for this purpose. In Figure 1 the plunger is shown in its most retracted position. At this time material in the hopper may flow through the cut-out portion 6 in the tube 4 into the tube. As the plunger 9 moves forward, it shoves this material ahead of it and cuts off the further entrance of material into the tube. As the plunger continues to move forwardly, the material which has been charged into the tube is compacted and compressed against material previously forced into the tube. This compacted and compressed mass is indicated at X in Figure 1. With each reciprocation of the plunger, additional material is thus forced against and compressed into the end of the mass X and the mass as a whole is forced toward the right as viewed in Figure 1 toward the discharge end of the tube 4. The rate at which the mass X is formed and pushed through the tube depends in part upon the speed of the plunger 9 and the length of its stroke.

So much of the construction as has heretofore been described is generally old in the art and forms no part of the present invention. For use according to the present invention the plunger 9 is provided at the rear end thereof with a socket 10. Projecting forwardly from this socket 10 is a plunger chamber 11. Extending axially along the ram or plunger 9 from the chamber 11 is a bore 12 and at the forward end of the bore 12 is a restricted passageway 13 which also extends axially of the plunger or ram 9 and opens into a chamber 14 in which there is a ball check valve 15 with a spring 16 for yieldably holding the ball seated against the outer end of the restricted orifice or passageway 13. A screw plug 17 in the end of the ram or plunger 9 affords access to this check valve. Spaced inwardly from the end of the ram or plunger 9 is an annular shallow groove 18. A plurality of radial holes 19 of very small diameter lead from the groove 18 into the chamber 14.

Entered into the socket 10 at the rear of the ram or plunger 9 is the cylindrical end of a coupling member 20, the coupling member 20 having a forwardly extending projection or plunger 21 the innermost end of which has a working fit in the chamber 11. This coupling has a flanged outer end portion 22 that is received in a rabbeted slot 23 in the cross head 9a, this connection between the cross head and the coupling member 20 being sufficiently loose to allow slight relative movement in either a vertical or transverse direction so that the head 9a may serve to transmit reciprocating motion to the ram or plunger 9 and still allow the ram or plunger to properly align itself in the tube or barrel in which it reciprocates. The coupling member 20 is connected to the plunger 9 through a lost motion connection comprising a slot 24 in the coupling member 20 and a transverse pin 25 which passes through the slot 24 and is carried by the outer end of the ram 9. In the socket 10 between the coupling member 20 and the inner end of the socket is a compression spring 26. The spring 26 is stiff and serves to transmit motion toward the right as viewed in Figure 1 from the cross head 9a to the plunger or ram 9. When, however, the resistance encountered by the ram 9 to further movement toward the right is sufficiently great, the spring 26 will compress allowing the coupling member 20 to continue to move toward the right relatively to the plunger and until the pin 25 is against the left-hand limit of the slot 24. In practice the spring 26 is selected to yield when the resistance offered by the ram 9 exceeds 160 to 165 lbs. per square inch. This may differ to a considerable extent depending upon the density desired in the final product, the cork particle size and other variable factors.

Opening into the chamber 11 is a nipple port in which is a nipple 27 to which is attached a flexible tube 28 leading from a lubricant reservoir 29. The lubricant reservoir contains the lubricating material to be applied to the interior of the barrel and it is in the form of a pressure-tight chamber. Air under pressure may be applied to the reservoir 29 through a pipe 30 and a pressure regulating valve 31. I have found that for the particular lubricant which I desire to employ, pressure of approximately 30 lbs. per square inch may be satisfactorily used in the reservoir for forcing the lubricant from the reservoir through the tube 28 into the chamber 11.

When the parts are in the position shown in Figure 1, lubricant is forced from the reservoir into the chamber 11 and along the barrel 12 but the pressure of the lubricant is normally insufficient to cause the lubricant to flow past the check valve 15. When the material being compacted offers sufficient resistance to the movement of the ram 9 so as to cause relative movement between the ram and the coupling 20, the plunger 21 on the coupling member 20 moves toward the right as viewed in Figure 1 along the chamber 11 thereby applying pressure to the lubricant in the chamber 11 and passageway 12 to force a limited amount of the lubricant through the orifice 13 past the check valve 15 and out the radial passageways 19 into the annular groove 18.

With the arrangement shown in Figure 1 the lubricant is applied only when the material in the extrusion tube or barrel builds up a resistance sufficient to cause a compression of the spring 26. If the material flows through the tube freely enough so that the spring 26 is not compressed, no lubricant is forced out. It will also be apparent that pressure required to compress the spring 26 is encountered only after the forward end of the plunger or ram 9 has moved past the hopper and is actually compacting the material in the projecting part of the tube or barrel 4. The lubricant is thus applied to the inner wall of the barrel at a point adjacent to where the resistance is high and the material is being compacted, at which time the plunger is near the innermost limit of its stroke.

If the spring 26 has been compressed and when the operating head 9a starts to retract, the spring 26 first expands to restore the parts to the position shown in Figure 1 and then the plunger or ram 9 is withdrawn to the position shown in Figure 1, the cross pin 25 serving to transmit motion from the cross head to the ram on the retracting stroke of the cross head.

The apparatus described provides for the ejection of a limited amount of lubricant to the walls of the extruding barrel or tube 4 at a time when the plunger is near the innermost limit of its stroke and at a time when the granular material which has been pushed forward by the plunger has been compacted sufficiently to cause the spring 26 to yield. When the plunger or ram retracts, the lubricant which has been forced out against the walls of the barrel 4 will be wiped or spread by the plunger and on the next forward stroke of the plunger, the loose granules which scrape or travel along this lubricated area will pick up some of the lubricant and as the extruding process continues carry the lubricant on through the extrusion tube. The application of lubricant to the cork particles will be only to those particles which wipe against the inner wall of the tube and consequently the lubricant will contact only those particles for the most part which form the outermost part or skin of the extruded article.

By reference to Figure 6, it will be noted that the holes 19 through which the lubricant passes from the center to the periphery of the ram or plunger are equidistantly spaced. This is not only to secure distribution of the lubricant around the inside of the barrel, but it also causes the pressure of the lubricant to be balanced on all sides of the plunger so that the plunger is not forced off center by the pressure of the incoming lubricant but is "floated" in a central position in the barrel.

Instead of constructing the apparatus so that it applies lubricant only when the friction of the material exceeds a certain maximum, a small amount of lubricant may be applied at regular intervals. The modification shown in Figures 2 and 3 illustrates an embodiment of my invention wherein the lubricant is applied at each stroke of the compacting ram or plunger. The general construction of the extruding machine shown in Figures 2 and 3 is of course the same as that shown in Figure 1, the difference residing in the particular arrangement for causing the expulsion of lubricant from the forming ram or plunger. In these views similar reference numerals have been used to indicate corresponding parts. In this modification a collar 32 is applied to the exterior of the ram 9 adjacent the rear end thereof, the collar and the plunger having interfitting parts to prevent relative longitudinal movement thereof. This collar may conveniently be made in two parts bolted together about the ram 9. As shown in Figure 3, the collar is provided with a plurality of adjustable bolts 33 which are screwed through the collar and which have terminal portions 34 adapted to strike a stationary part of the machine as for example the collar 5 when the plunger has been projected a predetermined distance toward the right from the position shown in Figure 1. When the terminal portions 34 of the bolts 33 contact a stationary part of the machine, the plunger 9 cannot move any further toward the right and continued application of pressure to the coupling member 20 causes the coupling member 20 to slide toward the right against the compression of the spring 26. The forward movement of the plunger 21 of the coupling member 20 in the chamber 11 forces lubricant through the ram or plunger in the manner described in connection with Figure 1. When the coupling member is puller toward the left as viewed in Figure 2, the spring 26 first acts to restore the coupling member 20 to its normal position relative to the ram or plunger 9 after which the plunger is retracted.

By turning the bolts 33 in one direction or the other, the point in the travel of the ram 9 at which they encounter the stationary part of the machine may be changed to vary the point on the interior of the barrel 4 at which lubricant is applied. The bolts 33 thus provide an adjustable abutment which limits the inward movement of the ram and at the same time determines the point at which lubricant is applied to the interior of the extrusion barrel or tube. In order to control the volume of lubricant which is ejected on each stroke, a spacing ring 35 is provided between the extreme end of the plunger 9 and a shoulder 36 formed on the coupling member 20. The maximum relative movement which can occur between the coupling member and the ram is thus limited by the thickness or width of the collar 35 in the direction of the axis of the plunger. If, for example, the ring shown in Figures 2 and 3 were replaced by a wider ring, there could be less relative movement between the parts so that the lubricant ejecting plunger 21 on the coupling member 20 would have less relative movement in the chamber 11 and therefore less lubricant would be ejected on each stroke. Vice versa, by substituting a narrower ring, more lubricant would be ejected on each stroke. It is of course feasible to use shims in addition to the ring 35 to provide small increments of change in the amount of relative movement to thereby avoid the substituting of one collar for another. The bolts 33 should be adjusted with changes in the spacing ring 35 so as to avoid any possibility of breakage if the operating head 9a has a predetermined length of stroke.

From the foregoing description it will be seen that in Figure 1 the injection of the lubricant is controlled by the resistance of material to movement through the tube and the volume of fluid is also regulated to some extent by this resistance because the greater the resistance the more the relative travel between the coupling member 20 and the main ram or plunger 9, whereas with the arrangement shown in Figure 2, lubricant is ejected on every stroke of the plunger and the volume of lubricant is controlled by definitely limiting the relative movement between the parts.

In order to more effectively spread the lubricant over the inner wall of the extrusion tube, it is desirable to impart a slight rotary motion to the main ram or plunger 9 while it is operating. This rotary motion not only more effectively spreads the lubricant over the interior of the barrel, but it also aids in preventing a cone of compacted cork and binder from building up on the inner end face of the plunger. In Figures 4 and 5, I have illustrated one arrangement for positively securing such rotary motion. In these figures the general construction and arrangement of the parts is the same as that heretofore described and similar reference numerals have been used to designate the corresponding parts.

In the construction shown in these two figures, the plunger or ram 9 is provided on its surface with a cam slot 37 of a length corresponding to the length of the stroke of the plunger and which has a helical pitch of a very gradual angle. Secured to a stationary part of the machine is a bracket 38 on the end of which is a cam roller 39 that engages in the slot 37, the arrangement being such that as the plunger reciprocates back and forth, the cooperation of the helical groove and the cam roller 39 will impart a slight rotary motion to the plunger or ram 9.

It will be understood that the modification shown in Figures 4 and 5 is applicable to either of the embodiments of the invention previously described. As a matter of practice, I have found that instead of using a means such as the cam and groove arrangement just described for rotating the plungers, a definite but less positive rotary movement may be obtained by making the flexible tubes 28 sufficiently heavy and of such length that when the plunger is reciprocated, the bending of these tubes between the plunger which reciprocates and the reservoir which is stationary will be such as to cause the plungers to rotate through a limited arc about their axes. If the plunger is turning while it is retracting over the inner wall of the barrel against which lubricant has been ejected through the ports 19, the end portion of the plunger or ram wiping over these lubricated areas spreads the lubricant to assure a more even distribution of the lubricant around the interior of the tube.

The check valve 15 has two important functions. First, it prevents the lubricant from forcing out of the ram or plunger under the pressure applied to the lubricant in the reservoir 29 so that the lubricant does not continuously drain or ooze from the plunger; and second, it prevents by holding back pressure in the passageways 19, the migration of minute cork particles into these passageways and the compacting of such particles therein so that the passageways always remain free and clear for lubricant. Instead of an open groove 19, there may be provided an annular recess which receives a relatively tightly matted hair felt washer through which the lubricant may be forced and effectively spread.

Because of the unique properties of cork and of the uses to which extruded cork is put, the lubricant is of a peculiar character. The usual oils and greases are not available because of the possibility of imparting a taste to the contents of any bottles in which such cork would be used as a cap liner. Lubricants employed are a pasty mixture of petroleum jelly and a rubber-containing material such as latex or a mixture of paraffin with a rubber-containing material such as latex. The latter is usually employed where the binder is a gelatine binder and the former where the binder is a resinous binder.

While we have illustrated certain specific embodiments of our invention and disclosed specific methods for practicing the same, it will be understood that various changes and modifications may be made in the apparatus and method within the contemplation of our invention and under the scope of the following claims.

We claim:

1. In the method of forming a molded mass of cork from a mass of cork particles and a binder by compacting successive charges of the mass-forming material in an extrusion tube, the step which comprises applying lubricant directly to the interior surface of the extrusion tube between the feeding of successive charges of cork particles into the extrusion tube.

2. The method of extruding cork in an extrusion apparatus having a compacting ram and an extrusion tube in which the cork granules are incrementally charged and fed into the extrusion tube which comprises directly supplying a fluid lubricant to the interior wall of the tube between the feeding of successive charges of cork particles into the extrusion tube in such manner that the material contacting the wall of the tube is substantially the only material brought into contact with the lubricant.

3. In the method of extruding cork by the extrusion process wherein increments of material are forced by a ram from a hopper into the tube and compacted therein which comprises applying a fluid lubricant to the interior wall of the tube between the compacted mass and the hopper between the feeding of the successive increments of the loose material into the tube.

4. In the method of forming extruded articles from granulated cork and a binder wherein small increments of the mass-forming material are successively pushed into an extrusion tube and compacted, the step which comprises applying lubricant to the wall of the tube between the successive introduction of some of the increments and after the compacting of the increment last introduced.

5. The method of forming cork articles by the extrusion method in which a mass of cork granules and a binder are incrementally fed, compacted, and forced through a tube which comprises lubricating the tube by the direct application of lubricant thereto between each successive introduction of an increment of cork granules whereby substantially only those cork particles which form the exterior of the extruded article are contaminated by the lubricant and thereafter removing such contaminated portion.

6. In the method of forming cork composition bodies by extrusion of comminuted cork and a binder through a tube, the steps of intermittently introducing increments of cork granules coated with a heat activatable binder into said tube and forcing the same therethrough, applying heat to said granules while confined in said tube to expand the same, activate the binder and form a bonded body, and supplying a lubricant directly to the interior surface of the extrusion tube prior to the movement of each successive increment into the heating zone to facilitate passage of the compacted granules through the heating zone after expansion of the cork granules induced by heat.

7. In the method of forming cork composition bodies by extrusion of comminuted cork and a binder through a tube, the steps of feeding cork granules coated with a binder into an extrusion tube, heating said cork granules while confined in said tube to expand the same, activate the binder and form a bonded body, and supplying a lubricant to the interior surface of the tube between the feeding of successive charges of cork particles to lubricate those cork particles which will form the outer surface of the article while said particles are confined in the tube prior to expansion.

FRANCIS B. MENGER.
LUTHER E. GAENZLE.